(12) United States Patent
Pinello-Benavides et al.

(10) Patent No.: US 11,852,104 B2
(45) Date of Patent: Dec. 26, 2023

(54) PROPULSION SYSTEM WITH SINGLE INITIATOR FOR MULTIPLE ROCKET MOTORS

(71) Applicant: Raytheon Company, Waltham, MA (US)

(72) Inventors: Jacob Pinello-Benavides, Tuscon, AZ (US); John Meschberger, Tucson, AZ (US); Stephen Moore, El Dorado Hills, CA (US); Edward Little, III, El Dorado Hills, CA (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 17/466,245

(22) Filed: Sep. 3, 2021

(65) Prior Publication Data

US 2023/0073547 A1    Mar. 9, 2023

(51) Int. Cl.
  *F02K 9/96*    (2006.01)
  *F02K 9/95*    (2006.01)
  *F02K 9/32*    (2006.01)

(52) U.S. Cl.
  CPC . *F02K 9/95* (2013.01); *F02K 9/32* (2013.01)

(58) Field of Classification Search
  CPC ..................... F02K 9/32; F02K 9/95
  See application file for complete search history.

(56) References Cited

U.S. PATENT DOCUMENTS

| | | | |
|---|---|---|---|
| 2,515,048 A | 7/1950 | Lauritsen | |
| 2,841,953 A * | 7/1958 | Teagne, Jr. | F02K 9/95 60/39.47 |
| 3,166,899 A | 1/1965 | Keathley | |
| 3,217,489 A | 11/1965 | King et al. | |
| 3,273,335 A | 9/1966 | Gravlin et al. | |

(Continued)

FOREIGN PATENT DOCUMENTS

| EP | 0028477 A1 | 5/1981 |
|---|---|---|
| JP | 2011117448 A | 6/2011 |
| KR | 101388098 B1 | 4/2014 |

OTHER PUBLICATIONS

Pending claims of co-pending U.S. Appl. No. 17/466,113, filed Sep. 3, 2021.

(Continued)

*Primary Examiner* — Lorne E Meade
(74) *Attorney, Agent, or Firm* — Renner, Otto, Boisselle, & Sklar (57) ABSTRACT

A propulsion system includes multiple solid rocket motors that are activated by a single initiator. The rocket motors act in parallel, providing thrust in a single direction. The initiator activates an ignition charge that is in or operatively coupled to a plenum that transports hot gasses from the ignition charge to the rockets to be ignited. The plenum may be an annular plenum, which may be located in an annular manifold. The plenum may be an unchoked plenum, allowing flow of hot gasses without choking. The plenum may be lined with an insulator material. A cover may be used to cover the plenum, and also to receive the rocket motors. The rocket motors may be solid-fuel rocket motors. The individual rocket motors may have separate ignition booster charges coupled to the plenum, which are ignited by the ignition charge and which in turn ignite the propellant grains.

16 Claims, 5 Drawing Sheets

(56) References Cited

U.S. PATENT DOCUMENTS

| | | | |
|---|---|---|---|
| 3,393,639 A | | 7/1968 | Bolieau et al. |
| 3,555,825 A | | 1/1971 | Dilchert |
| 3,687,080 A | * | 8/1972 | Hofmann .................. F02K 9/95 |
| | | | 60/39.47 |
| 3,735,985 A | * | 5/1973 | Layer ...................... F42B 15/00 |
| | | | 273/365 |
| 3,757,692 A | * | 9/1973 | Maue ........................ C06C 9/00 |
| | | | 102/380 |
| 4,980,601 A | | 12/1990 | Aoki et al. |
| 5,159,809 A | * | 11/1992 | Ciais ........................ F02K 9/82 |
| | | | 60/225 |
| 11,643,997 B2 | * | 5/2023 | Pinello-Benavides .... F02K 9/76 |
| | | | 60/224 |
| 2016/0115905 A1 | * | 4/2016 | Suzuki ...................... F02K 9/95 |
| | | | 60/204 |

OTHER PUBLICATIONS

Pending claims of co-pending U.S. Appl. No. 17/466,248, filed Sep. 3, 2021.

* cited by examiner

PROPULSION SYSTEM WITH SINGLE INITIATOR FOR MULTIPLE ROCKET MOTORS

GOVERNMENT RIGHTS

This invention was made with government support under government contract HQ0727-19-F-1611 awarded by the United States Department of Defense. The government has certain rights in the invention.

FIELD

The present disclosure is in the field of devices and methods for propulsion using rocket motors.

BACKGROUND

Rocket motors are a known way to provide thrust. Multi-motor thrust systems are not typically utilized when the thrust system cannot be put on the centerline of the body. In addition, multi-motor ignition systems typically require multiple initiators with complex factors including ignition timing and thrust balancing for successful launch.

SUMMARY

According to an aspect of the disclosure, a propulsion system has multiple rocket motors activated by a single initiator.

According to an aspect of the disclosure, multiple rocket motors are operatively coupled together through a single plenum.

According to an aspect of the disclosure, a propulsion system includes: a manifold; and an initiator operatively coupled to the manifold; wherein the manifold has a plenum therein to which multiple rocket motors may be coupled, to provide ignition to the multiple rocket motors.

According to an embodiment of any paragraph(s) of this summary, the plenum is an annular plenum.

According to an embodiment of any paragraph(s) of this summary, the plenum is in an annular manifold.

According to an embodiment of any paragraph(s) of this summary, the initiator is coupled to an outer surface of the manifold.

According to an embodiment of any paragraph(s) of this summary, the system further includes an ignition material in the plenum, configured to be ignited by the initiator.

According to an embodiment of any paragraph(s) of this summary, the system further includes a cover on the manifold.

According to an embodiment of any paragraph(s) of this summary, the cover has mounts for receiving the rocket motors.

According to an embodiment of any paragraph(s) of this summary, the mounts have chambers therein, with ignition boosters in the chambers.

According to an embodiment of any paragraph(s) of this summary, the plenum is a non-annular plenum.

According to an embodiment of any paragraph(s) of this summary, the non-annular plenum includes radial channels.

According to an embodiment of any paragraph(s) of this summary, the non-annular plenum includes circumferential connections between the radial channels.

According to an embodiment of any paragraph(s) of this summary, the initiator is coupled to the non-annular plenum at a center of the non-annular plenum.

According to an embodiment of any paragraph(s) of this summary, the system further includes an insulator on an inner surface of the plenum.

According to an embodiment of any paragraph(s) of this summary, the insulator is a silicone material.

According to an embodiment of any paragraph(s) of this summary, the system further includes the rocket motors, operatively coupled to the plenum.

According to an embodiment of any paragraph(s) of this summary, the rocket motors are circumferentially spaced around the manifold.

According to an embodiment of any paragraph(s) of this summary, the rocket motors are threadedly coupled to mounts on a cover on the manifold.

According to another aspect of the disclosure, a flight vehicle includes: a fuselage; and a propulsion system coupled to the fuselage, the propulsion system including: a manifold; and an initiator operatively coupled to the manifold; wherein the manifold has a plenum therein to which multiple rocket motors may be coupled, to provide ignition to the multiple rocket motors.

According to an embodiment of any paragraph(s) of this summary, the manifold is an annular manifold with a central opening; and the flight further includes a jet engine making use of the central opening.

According to yet another aspect of the disclosure, a method of operating a propulsion system includes the steps of: igniting an ignition charge in a plenum in a manifold; and using pressurized gasses from the plenum to ignite multiple rockets that are operatively coupled to the plenum and mechanically coupled to the manifold.

According to an embodiment of any paragraph(s) of this summary, the manifold is made of metal.

According to an embodiment of any paragraph(s) of this summary, wherein the manifold is made of steel.

According to an aspect of the disclosure, a propulsion system includes: a manifold; and an initiator operatively coupled to the manifold; wherein the manifold has a plenum therein to which multiple rocket motors may be coupled, to provide ignition to the multiple rocket motors; and wherein the plenum is a non-annular plenum.

According to an embodiment of any paragraph(s) of this summary, the manifold is a cylindrical manifold.

According to an embodiment of any paragraph(s) of this summary, at least some of the rocket motors are circumferentially spaced around the manifold.

According to an embodiment of any paragraph(s) of this summary, one of the rocket motors is located along a longitudinal axis of the propulsion system.

According to an embodiment of any paragraph(s) of this summary, the at least some of the rocket motors are pairs of rocket motors diametrically opposed to one another.

According to another aspect of the disclosure, a flight vehicle includes: a fuselage; and a propulsion system coupled to the fuselage, the propulsion system including: a manifold; and an initiator operatively coupled to the manifold; wherein the manifold has a non-annular plenum therein to which multiple rocket motors may be coupled, to provide ignition to the multiple rocket motors.

According to still another aspect of the disclosure, a method of operating a propulsion system includes the steps of: igniting an ignition charge in a non-annular plenum in a manifold; and using pressurized gasses from the plenum to ignite multiple rockets that are operatively coupled to the non-annular plenum and mechanically coupled to the manifold.

While a number of features are described herein with respect to embodiments of the disclosure; features described with respect to a given embodiment also may be employed in connection with other embodiments. The following description and the annexed drawings set forth certain illustrative embodiments of the disclosure. These embodiments are indicative, however, of but a few of the various ways in which the principles of the disclosure may be employed. Other objects, advantages, and novel features according to aspects of the disclosure will become apparent from the following detailed description when considered in conjunction with the drawings.

BRIEF DESCRIPTION OF THE DRAWINGS

The annexed drawings, which are not necessarily to scale, show various aspects of the disclosure.

DETAILED DESCRIPTION

A propulsion system includes multiple solid rocket motors that are activated by a single initiator. The rocket motors act in parallel, providing thrust in a single direction. The initiator activates an ignition charge that is in or operatively coupled to a plenum that transports hot gasses from the ignition charge to the rockets to be ignited. The plenum may be an annular plenum, which may be located in an annular manifold. The plenum may be an unchoked plenum, allowing flow of hot gasses without choking. The plenum may be lined with an insulator material. A cover may be used to cover the plenum, and also to receive the rocket motors. The rocket motors may be solid-fuel rocket motors, with propellant grains and nozzles. The individual rocket motors may have separate ignition booster charges coupled to the plenum, which are ignited by the ignition charge and which in turn ignite the propellant grains.

Figure 1:
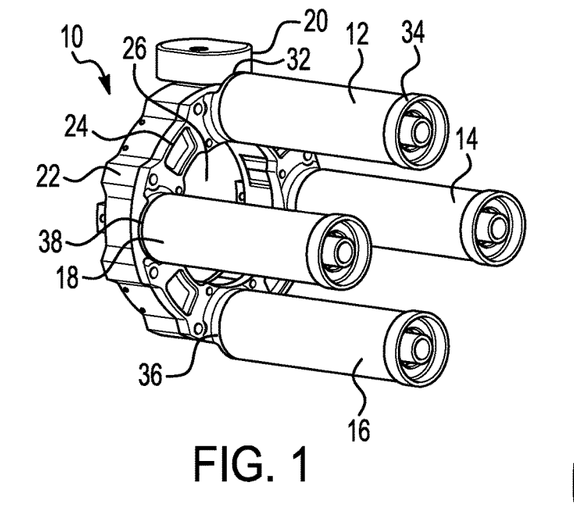
FIG. 1 is an oblique view of a propulsion system in accordance with an embodiment of the disclosure.

FIG. 1 shows a propulsion system 10 that includes multiple solid rocket motors 12, 14, 16, and 18, which are activated (ignited) by a single initiator 20. The rocket motors 12-18 and the initiator 20 are both attached to a manifold 22. As described further below the manifold 22 includes a passage therein, a plenum, linking the initiator 20 to the rocket motors 12-18.

A cover 24 on the manifold 22 encloses and partially defines the plenum, and provides mounts 32, 34, 36, and 38 to which the rocket motors 12-18 are secured. The cover 24 and the manifold 22 may be made of suitable metal, such as steel, aluminum, titanium, or other suitable metals (or non-metals).

In the illustrated embodiment the manifold 22 has an annular shape, with material of the manifold 22 around a central opening 26. In other embodiments, some of which are described below, the manifold 22 may have other shapes.

Figure 2:
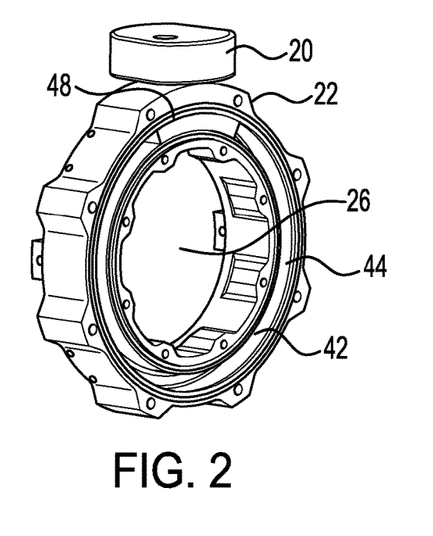
FIG. 2 is an oblique view of part of the propulsion system of FIG. 1.
Figure 3:
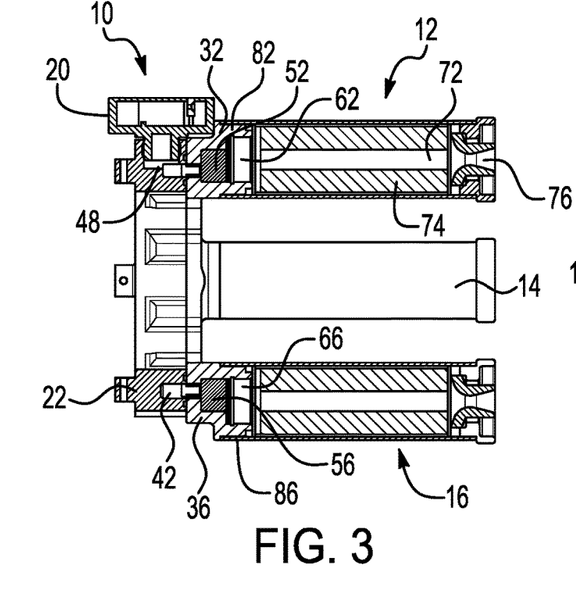
FIG. 3 is a side sectional view of the propulsion system of FIG. 1.

Referring in addition to FIGS. 2 and 3, further details are shown of inner parts of the propulsion system 10. FIG. 2 shows an annular plenum 42 that is in the manifold 22, that provides a fluid communication to (and between) the rocket motors 12-18. The plenum 42 may be lined with a thermal insulator material 44, which aids in protecting the manifold 22 and the cover 24 from erosion from hot gasses, or from other effects of exposure to hot gas (such as from heating). An example of a suitable thermal insulating material is silicone RTV, although a variety of other suitable materials may be used as alternatives. The insulator material 44 may only need to be operative for during the transient time when operation of the rocket motors 12-18 is initiated. Other instances of motor operation may require insulation through the entire operation of the motor.

An ignition charge 48 is located within the plenum 42. As seen in FIG. 2, the ignition charge 48 fills a part of the plenum 42 but not all of the plenum 42. The ignition charge 48 is aligned with only one of the rocket motors 12-18, specifically rocket motor 12 in the illustrated figures, while not being aligned with any of the other rocket motors, e.g. rocket motors 14-18. The initiator 20 ignites the ignition charge 48. Hot pressurized gasses from the ignited ignition charge 48 go through plenum 42 to ignite the rockets 12-18. The initiator 20 may ignite the ignition charge 48 using any suitable mechanism, including chemical ignition using an energetic chemically-reacting starter material, or electrical ignition, such as with use of a bridge wire. The ignition charge 48 may be a length of igniter material or rapid deflagration cord.

The hot gasses from the ignition charge 48 ignite ignition booster charges, such as the charges 52 and 56 (FIG. 3), corresponding to respective of the rocket motors 12-18. The ignition booster charges 52 and 56 may be located in chambers, such as chambers 62 and 66, that are in the mounts 32-38 that receive the rocket motors 12-18.

With reference to the rocket motor 12, the ignition booster charge 52 produces hot ignition products that enter a combustion chamber 72 in a solid fuel grain 74, and ignite the grain 74. The burning solid fuel 74 produces pressurized gasses that pass through a nozzle 76 on a distal end of the rocket motor 12, producing thrust. Similar processes occur in the other rocket motors 14-18.

The mounts 32-38 may have threaded connections, such as externally threaded connectors 82 and 86, that allow the rocket motors 12-18 to be threaded onto the mounts 32-38. The mounts 32-38 may receive any of a variety of different types of rocket motors 12-18, for example having different propellants, different combustion chamber configurations, and/or other differences, for example providing different amounts of thrust and/or different thrust profiles.

The illustrated embodiment has four rocket motors 12-18, evenly distributed around the manifold 22. Alternatively the propulsion system 10 may have a different number of rocket motors (greater or lesser), although it is desirable that the rocket motors be symmetric with regard to a center of the system.

The propulsion system 10 has many advantages, for example flexibility in configuration, reduction in number of parts, and ensuring simultaneity in ignition of the rockets 12-18. In addition the coupling of the rocket motors 12-18 through the plenum 42 may aid in equilibrating operation of the rocket motors 12-18 with each other, for example in avoiding pressure differences between the rocket motors 12-18. Any combination of or all of these benefits may be achieved in a particular system.

Figure 4:
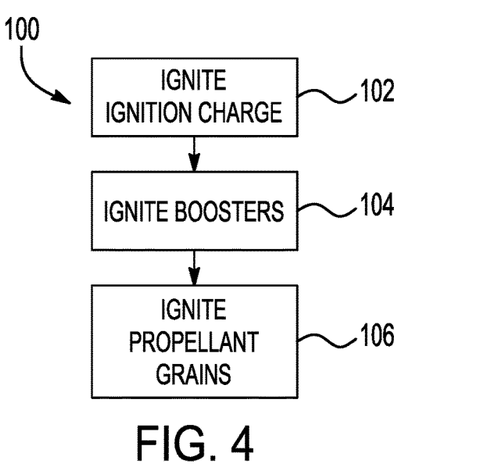
FIG. 4 is a high-level flowchart of a method of using a propulsion system, such as the system of FIG. 1, according to an embodiment of the disclosure.
Figure 5:
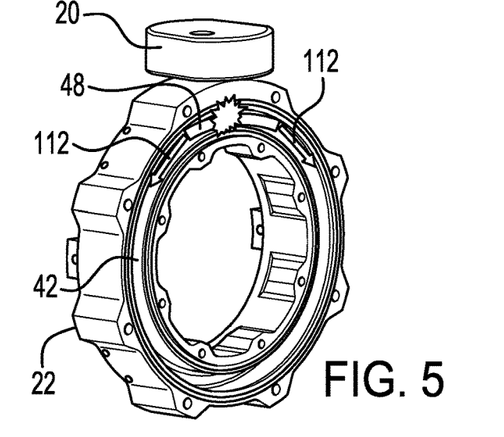
FIG. 5 is an oblique view of the propulsion system of FIG. 1, at a first step of the method of FIG. 4.
Figure 6:
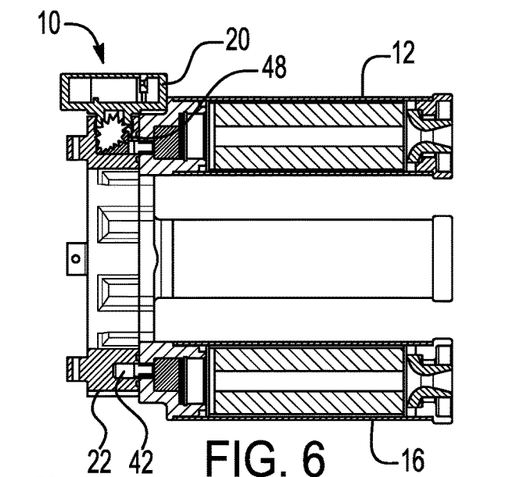
FIG. 6 is a side sectional view of the propulsion system of FIG. 1, at the first step of the method of FIG. 4.

FIG. 4 shows high-level steps of a method 100 of operating the system 10 (FIG. 1), with FIGS. 5-10 illustrating the steps of the method 100. In step 102, illustrated in FIGS. 5 and 6, the initiator 20 sets off the ignition charge 48, filling the plenum 42 with hot gasses 112.

Figures 7, 8:
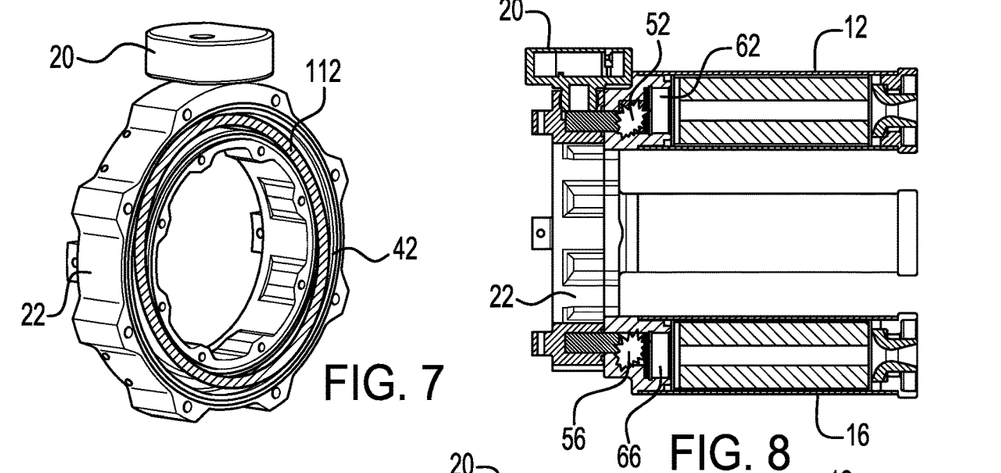
FIG. 7 is an oblique view of the propulsion system of FIG. 1, at a second step of the method of FIG. 4.
FIG. 8 is a side sectional view of the propulsion system of FIG. 1, at the second step of the method of FIG. 4.

FIGS. 7 and 8 illustrate step 104, where hot gasses 112 have fully filled the plenum 42. The hot gasses 112 enter the chambers 62 and 66, where the hot gasses 112 ignite the booster charges 52 and 56.

Figure 9:
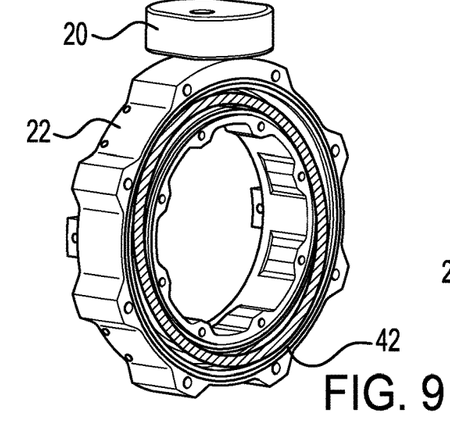
FIG. 9 is an oblique view of the propulsion system of FIG. 1, at a third step of the method of FIG. 4.
Figure 10:
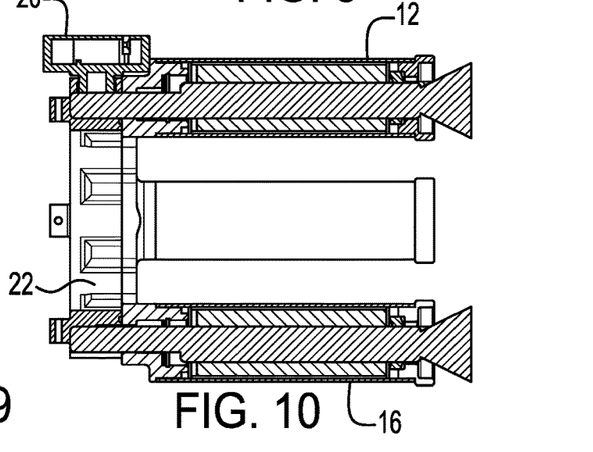
FIG. 10 is a side sectional view of the propulsion system of FIG. 1, at the third step of the method of FIG. 4.

FIGS. 9 and 10 illustrate step 106, with the booster charges 52 and 56 igniting the propellent grains of the rocket motors 12 and 16. Similar booster charges simultaneously ignite the other rocket motors as well. The rocket motors 12-18 produce thrust and, as mentioned earlier, the fluid communication of the rocket motors 12-18 through the plenum 42 may tend to equalize the operation of the different rocket motors 12-18.

Figure 11:
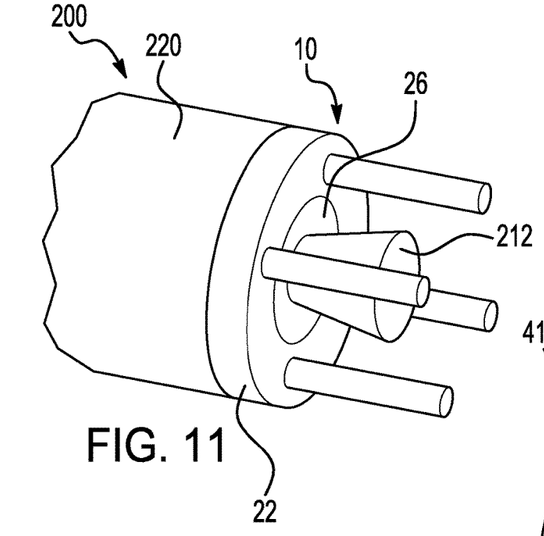
FIG. 11 is an oblique view of a portion of a flight vehicle that includes the propulsion system of FIG. 1.

FIG. 11 shows one possible use for the propulsion system 10, as part of a missile or other flight vehicle 200. The missile 200 may have the propulsion system 10 used to provide propulsive thrust in conjunction with another propulsion device 212 that is located in or makes use (such as by expelling pressurized gasses through) the central opening 26 in the manifold 22. For example the additional propulsion device 212 may be a jet engine. The propulsion system 10 may be coupled to an aft end of a fuselage 220 of the flight vehicle 200.

Figure 12:
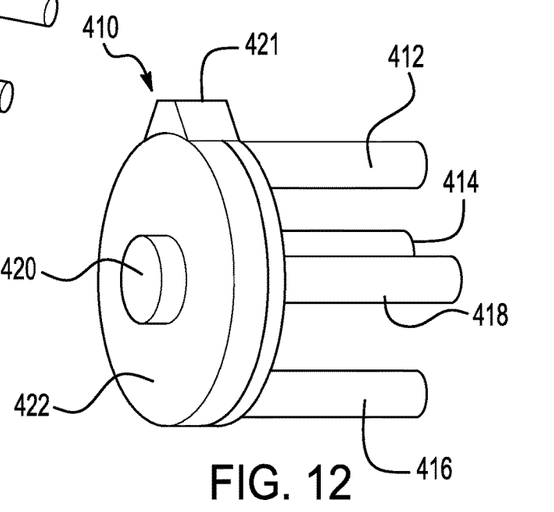
FIG. 12 is an oblique view of a propulsion system in accordance with another embodiment of the disclosure.
Figure 13:
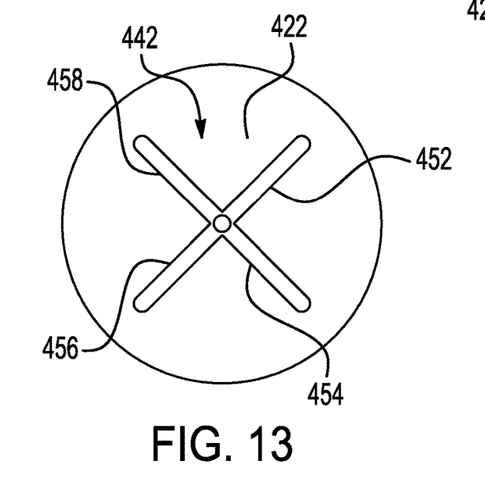
FIG. 13 is a plan view of one configuration of the manifold of the propulsion system of FIG. 12.

FIG. 12 shows an alternative embodiment, a propulsion system 410 with a disk-shaped manifold 422, having rocket motors 412, 414, 416, and 418 attached thereto. An initiator 420 is attached to the manifold 422 at the center of a major surface of the manifold 422. The initiator 420 is able to activate the rocket motors 412-418 through a plenum in the manifold. In one configuration, illustrated in FIG. 13, a plenum 442 has a star shape, with radial passages 452, 454, 456, and 458 extending from a center of the plenum 442 to locations where the rockets 412-418 are connected to the manifold 422.

Figure 14:
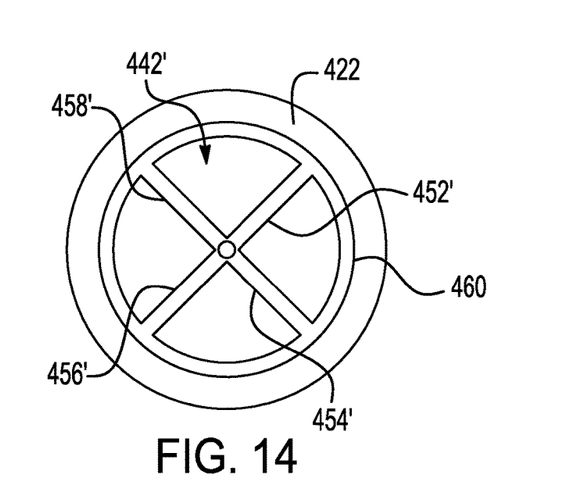
FIG. 14 is a plan view of another configuration of the manifold of the propulsion system of FIG. 12.
Figures 15, 16:
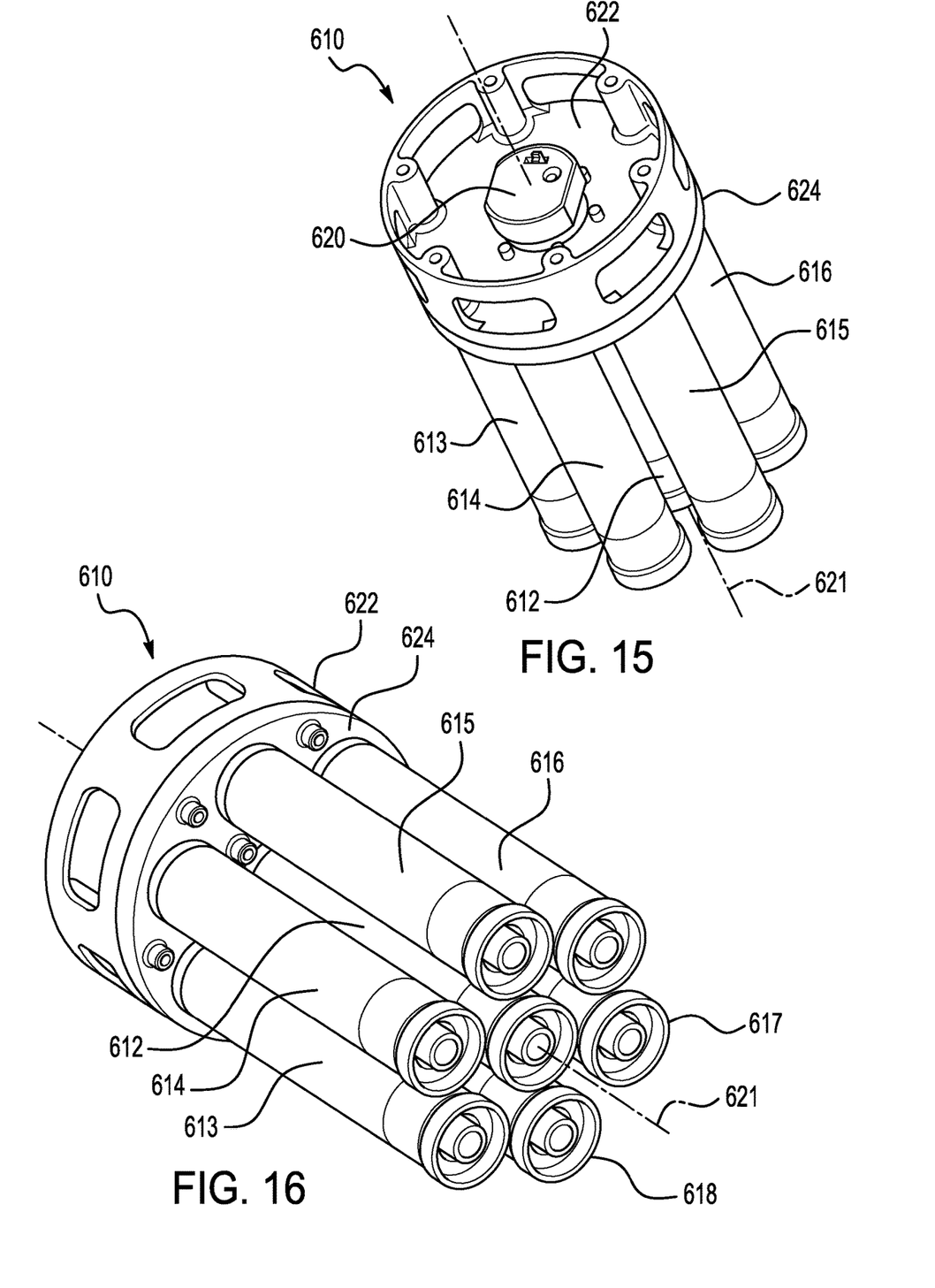
FIG. 15 is an oblique view of a propulsion system in accordance with yet another embodiment of the disclosure.
FIG. 16 is another oblique view of the propulsion system of FIG. 15.

In another embodiment, illustrated in FIG. 14, a plenum 442' has a circumferential passage 460 in addition to radial passages 452', 454', 456' and 458', forming a spokes-and-wheel arrangement. The plenum 442' may provide for better pressure equalization between different of the rockets 412-418 (FIG. 12).

FIGS. 15-19 show another embodiment, a propulsion system 610 that includes seven rocket motors 612, 613, 614, 615, 616, 617, and 618, all of which are ignited by a single initiator 620. The rocket motors 612-618 include a central longitudinal rocket motor 612, along a longitudinal axis 621 of the propulsion system 610, surrounded by six rocket motors 613-618 circumferentially spaced at a radial distance away from the longitudinal axis 621.

The initiator 620 is attached at a center of a cylindrical or disc-shaped manifold 622, with a cover 624 providing mounts 632, 633, 634, 635, 636, 637, and 638 for securing respective of the rocket motors 612-618. The mounts 632-628 have threaded connectors for making threaded connections to the rocket motors 612-618, and have respective chambers containing respective ignition booster charges, both of which are described above with regard to other embodiments. The cover 624 on the manifold 622 encloses and partially defines a star-shaped plenum 642, which may be lined with a thermal insulation material. The plenum 642 has a central ignition charge 648, located at the center of the plenum 642, where the initiator 620 is located.

Figures 17, 18, 19:
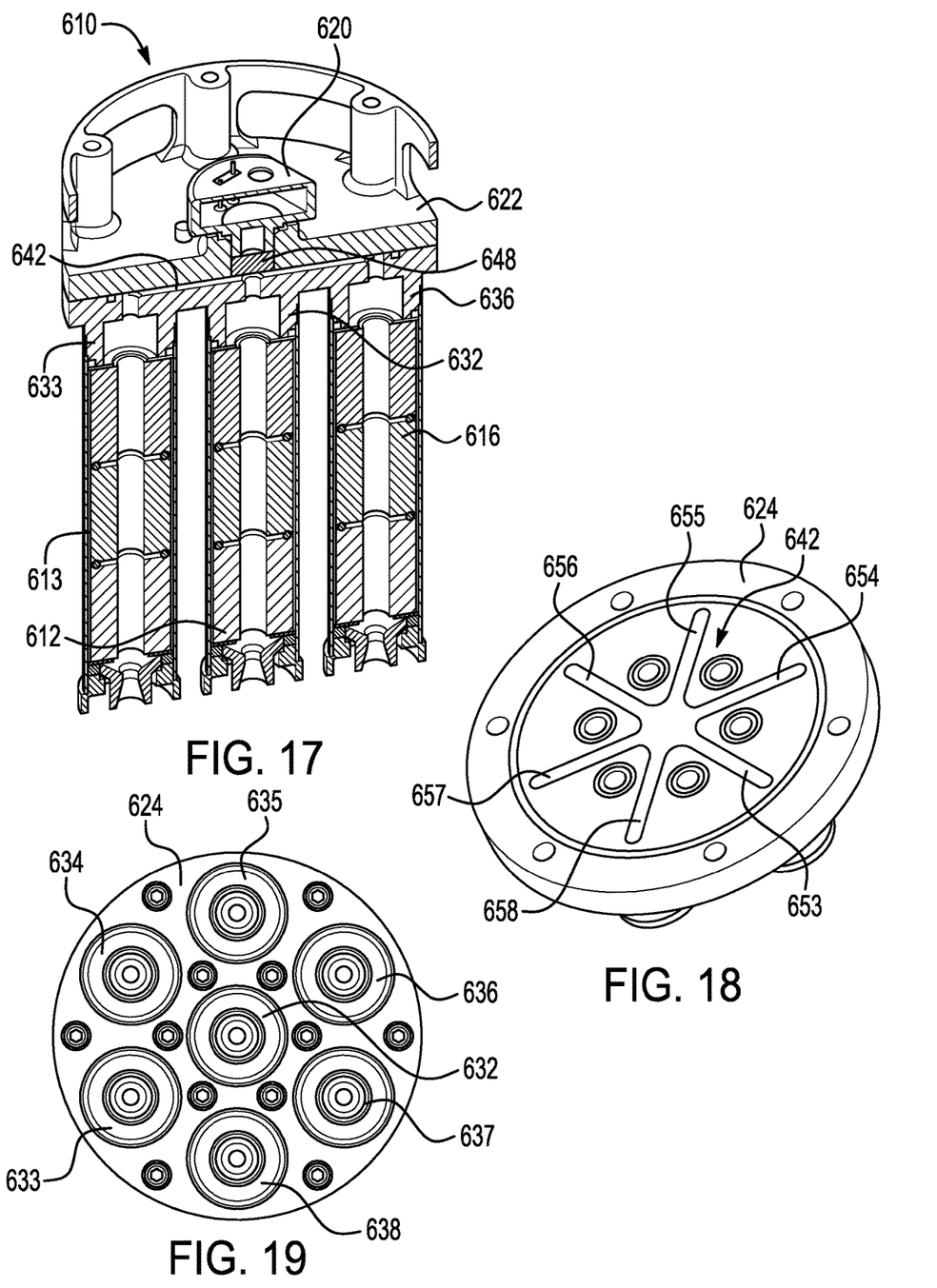
FIG. 17 is a side sectional view of the propulsion system of FIG. 15.
FIG. 18 is an oblique view of a manifold cover of the propulsion system of FIG. 15, illustrating the configuration of the non-annular plenum.
FIG. 19 is a bottom view showing mounts of the cover of FIG. 18.

The ignition charge 648 is ignited, igniting the central rocket motor 612 at the center of the plenum 642. Pressurized gasses spread out from the center of the plenum 642 through radial channels or arms 653, 654, 655, 656, 657, and 658 of the plenum 642, which are in fluid communication with respective rocket motors 613-618, to ignite the rocket motors 613-618. Operation of the rocket motors 612-618, once ignited, may be similar to (or the same as) that described above in other embodiments.

Although the disclosure has been shown and described with respect to a certain embodiment or embodiments, equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the disclosure. In addition, while a particular feature of the disclosure may have been described above with respect to only one or more of several illustrated embodiments, such feature may be combined with one or more other features of the other embodiments, as may be desired and advantageous for any given or particular application.

What is claimed is:

1. A propulsion system comprising:
  a manifold; and
  an initiator operatively coupled to the manifold;
  wherein the manifold has a plenum therein to which multiple rocket motors are couplable via separate mounts for each of the multiple rocket motors, to provide ignition to the multiple rocket motors',
  wherein the plenum is an annular plenum with an ignition charge connected to the initiator therein, wherein the ignition charge is aligned with only one rocket motor of the multiple rocket motors, wherein the ignition charge is in a part but not all of the plenum;

wherein ignition of the initiator fills the plenum with hot gasses, wherein when the hot gasses have fully filled the plenum, the hot gasses enter the separate mounts to ignite separate ignition booster charges in each mount to provide ignition to each of the multiple rocket motors attached to the separate mounts.

2. The propulsion system of claim 1, wherein the manifold is an annular manifold.

3. The propulsion system of claim 1, wherein the initiator is coupled to an outer surface of the manifold.

4. The propulsion system of claim 1, further comprising a cover on the manifold.

5. The propulsion system of claim 4, wherein the cover has the mounts for receiving the rocket motors.

6. The propulsion system of claim 4, wherein the mounts have chambers therein, with the ignition boosters in the chambers.

7. The propulsion system of claim 1, wherein the manifold is made of metal.

8. The propulsion system of claim 1, wherein the manifold is made of steel.

9. The propulsion system of claim 1, further comprising an insulator on an inner surface of the plenum.

10. The propulsion system of claim 9, wherein the insulator is a silicone material.

11. The propulsion system of claim 1, further comprising the rocket motors, operatively coupled to the plenum.

12. The propulsion system of claim 11, wherein the rocket motors are circumferentially spaced around the manifold.

13. The propulsion system of claim 11, wherein the rocket motors are an even number of rocket motors.

14. The propulsion system of claim 13, wherein the rocket motors includes pairs of rocket motors diametrically opposed to one another.

15. The propulsion system of claim 11, wherein the rocket motors are threadedly coupled to mounts on a cover on the manifold.

16. A flight vehicle comprising:
   a fuselage; and
   a propulsion system coupled to the fuselage, the propulsion system including:
      a manifold; and
      an initiator operatively coupled to the manifold;
      wherein the manifold has a plenum therein to which multiple rocket motors are couplable via separate mounts for each of the multiple rocket motors, to provide ignition to the multiple rocket motors;
   wherein the plenum is an annular plenum with an ignition charge connected to the initiator therein, wherein the ignition charge is aligned with only one rocket motor of the multiple rocket motors, wherein the ignition charge is in a part but not all of the plenum;
   wherein ignition of the initiator fills the plenum with hot gasses, wherein when the hot gasses have fully filled the plenum, the hot gasses enter the separate mounts to ignite separate ignition booster charges in each mount to provide ignition to each of the multiple rocket motors attached to the separate mounts.

\* \* \* \* \*